United States Patent Office 3,320,080
Patented May 16, 1967

3,320,080
WATER RESISTANT PAPER COATING COMPOSITIONS
Emil D. Mazzarella, Plainfield, and Edward Dalton, Jersey City, N.J., assignors to National Starch and Chemical Corporation, New York, N.Y., a corporation of Delaware
No Drawing. Filed June 5, 1964, Ser. No. 373,070
8 Claims. (Cl. 106—210)

This invention relates to improved water resistant paper coating compositions. More particularly, it relates to novel binders for use in such paper coating compositions.

It is the prime object of this invention to provide novel binders for use in pigmented paper coating compositions wherein the presence of said binders results in an exceptionally high degree of water resistance on the part of the resulting coatings. Various other objects and adantages of this invention will be apparent from the following description thereof.

It is well known in the art that paper is quite frequently coated as a means of improving its receptivity to printing inks, its optical characteristics and overall appearance as well as to achieve various other desired properties. The major components of a paper coating composition are ordinarily a pigment, such as clay, and a binder which serves to bind the pigment particles to one another as well as to adhere them to the surface of the paper.

Various types of starches have long been used as binders in such pigmented paper coatings. Their choice for this application has been dictated by their low cost, their good color, their ease of application, and their lack of odor along with a reduced tendency towards foaming and spoilage as compared with proteinaceous binders such as casein.

Of late, there has been an increased demand for coated paper and paperboard displaying greater resistance to water. Such water resistant papers are required for offset printing, for frozen food containers and labels, and for many other applications wherein the coating is likely to come into contact with water or a damp atmosphere.

As a result, many attempts have been made to modify starches in order to effect an improvement in their water resistance. Thus, for example, U.S. Patent 2,549,177, patented Apr. 17, 1951, teaches the surface sizing of paper with a pigment free coating composition whose binder is an insolubilized, i.e. crosslinked, starch resulting from the reaction of starch with glyoxal. In using starch in such a surface sizing process, a more or less continuous film is applied to the surface of the paper to cement the surface fibers to the body of the paper and to form a film on the sheet surface. The purpose of surface sizing is to decrease the penetration of oils, greases, writing fluids, etc., and to increase the resistance of the surface to picking and scuffing. In contrast, in paper coating, a layer of pigment particles is deposited on the paper surface primarily to receive the subsequent printing and the amount of the adhesive binder is kept to a minimum to retain the ink receptivity of the pigment layer, and also to avoid reduction in the brightness of the pigment particles.

In Canadian Patent No. 658,091, however, this concept of utilizing an insolubilized starch, in the manner disclosed in the above described patent, has now been adapted for use in a pigmented coating composition. Nonetheless, even with the use of these insolubilized starches of the prior art, the resulting pigmented coatings still left much to be desired with respect to their ultimate degree of water resistance as well as with regard to the rather high concentrations of the insolubilizing reagents which were ordinarily required for the preparation of these insolubilized starches.

In U.S. Patent No. 3,052,561, patented Sept. 4, 1962, there is described a novel class of pigmented paper coatings compositions wherein the binder for the system comprises a cationic starch derivative. As described in the latter patent, the use of such cationic starch binders bears no relation to the preparation of water resistant coatings but is seen, rather, to provide a means for reducing the solids content of pigmented coating compositions which, in turn, allows for a decrease in both the basis weight and the coating weight of the thus coated papers while also serving to increase the pick strength of the resulting coatings.

We have now discovered, however, that by employing insolubilized cationic starch derivatives as binders for pigmented coating compositions, it is possible to prepare coated papers displaying an unusually high degree of water resistance thereby permitting the thus coated papers to be utilized in all applications wherein water or moisture are likely to be encountered. Moreover, of equal significance in the process of our invention is the fact that relatively low concentrations of insolubilizing reagents are required in order to produce these insolubilized cationic starch binders.

In brief, the novel products of our invention comprise pigmented paper coating compositions containing, as the binder therein, a cationic starch derivative along with an insolubilizing reagent which serves to insolubilize or crosslink the latter cationic starch derivative. Inasmuch as there is no recognizable property inherent in cationic starch derivatives which would have led one to consider them for use as binders for the preparation of water resistant coatings, it is indeed surprising and unexpected to find that their use, when insolubilized, results in pigmented paper coatings whose water resistance is so superior to that obtained by the use, as binders, of either standard, i.e. non-cationic, starches as well as standard starches which have been similarly insolubilized.

We have found that these cationic starch derivatives may be used in partial or complete replacement of the ordinary starch commonly used as the binder in pigmented paper coating compositions. They may also be used in conjunction with (or in complete replacement of) other binders, such for example as synthetic resins, casein, and the like.

Cationic starch derivatives may be made, for example, by reacting starch, ordinarly through an etherification or esterification reaction, with any reagent which will introduce into the starch a cationic group containing nitrogen, sulfur or phosphorus. Examples of such groups are the amine (tertiary or quaternary), sulfonium and phosphonium groups. Our preferred cationic starch derivative are the tertiary amino alkyl ethers resulting from the reaction of starch, under alkaline conditions, with a dialkyl amino alkyl epoxide or dialkyl amino alkyl halide, or the corresponding compounds containing aryl groups in addition to the alkyl groups. The production of such products is described in U.S. Patent 2,813,093, patented Nov. 12, 1957.

Although we prefer the tertiary amino alkyl ethers of starch, one may also employ tertiary amino alkyl ethers of starch which also contain either hydroxyalkyl, e.g. hydroxyethyl, hydroxypropyl, etc., groups or ester, e.g., acetate, sulfate, phosphate, etc. groups. Such difunctional derivatives may be prepared by subjecting starch to a hydroxyalkylation or esterification reaction along with the requisite aminoalkylation reaction in a procedure whereby the two reactions may be conducted simultaneously or in any desired order.

As pointed out previously, the sulphonium and phosphonium derivatives of starch are also cationic and therefore suitable for the purposes of our invention. The preparation of sulfonium derivatives of starch is described in U.S. Patent No. 2,989,520, patented June 20, 1961, and involves essentially the reaction of starch, in an aqueous alkaline medium, with a beta-halogeno alkyl sulfonium salt, vinyl sulfonium salt or epoxyalkyl sulfonium salt. The preparation of phosphonium derivatives of starch is described in U.S. Patent No. 3,077,469, patented Feb. 12, 1963, and involves essentially the reaction of starch, in alkaline medium, with a beta-halogenoalkyl phosphonium salt. Other suitable starch derivatives will be apparent to the practitioner since our invention may employ any starch derivative which has been rendered cationic by the introduction of an electrically positively charged moiety into the starch molecule.

Returning now to the class of cationic starch derivatives containing amine groups, the following are some representative reagents which may be reacted with starch to result in such derivatives: beta diethyl amino ethyl chloride; beta dimethyl amino isopropyl chloride; beta diethyl amino ethyl chloride; 3-diethyl amino 1,2-epoxypropane; 3-dibutyl amino, 1,2-epoxypropane; 2-bromo-5-diethyl amino pentane hydrobromide; N-(2,3-epoxypropyl)-piperidine; N,N - (2,3 - epoxypropyl)methyl aniline. The various halides (e.g. chloro-, bromo-, etc.) can be used interchangeably. In the above reagents, where the free amines have been indicated (e.g., beta diethyl amino ethyl chloride), one can also use the hydrochloride or other salts of these reagents (e.g., beta diethyl amino ethyl chloride hydrochloride). In fact, it is ordinarily preferred to use the salts since these tend to be less toxic and more easily handled. The hydrochloride moiety takes no part in the reaction with the starch. It will be seen that beside the alkyl, aryl and aralkyl types, the reagents may also include those containing cyclic groups. Therefore, when reference is made herein to the alkyl, aryl or aralkyl groups, it will be understood that these cyclic reagents are equivalents of those types. It should also be mentioned that the starch-amine products may be subsequently treated by known methods, so as to result in the quaternary ammonium salt, or such a quaternary ammonium salt may be made directly from raw starch by treating it with the reaction product of an epihalodhydrin and a tertiary amine or tertiary amine salt. In either case the resulting starch derivative is of course also cationic, and suitable for our invention.

The term "starch" includes any amylaceous substance such as untreated starch, as well as starch which has been treated by chemical or other means to produce oxidized, dextrinized, hydrolyzed, esterified or etherified derivatives of starch, so long as the product is still essentially amylaceous in nature and still contains hydroxyl groups capable of reacting with reagents serving to introduce cationic groups. The starches may be derived from any plant sources, including corn, high amylose corn, waxy maize, sorghum, tapioca, potato, wheat, rice and sago.

It is well known that starch in its natural state exists in the form of discrete granules, which in the presence of water and heat or certain chemicals (such as strong alkalis) undergo gelatinization. The phenomenon of gelatinization involves the swelling, rupture and disintegration of the starch granules, so that they disperse in water to form a homogeneous hydrated colloidal dispersion. Starch which has been thus gelatinized and dried, will, upon subsequent mixing with water, disperse without the aid of heat. On the other hand, ungelatinized starch will quickly settle out of a water suspension, unless sufficient heat is applied to gelatinize and disperse the granules (this is referred to as "cooking" the starch, to form a useable dispersion). The cationic starch derivatives may be prepared in either the ungelatinized or gelatinized form, and both are suitable for our invention. In order to produce the starch derivatives in ungelatinized form, it is of course necessary to avoid those conditions of heat or alkalinity during the reaction which will cause the starch to gelatinize, or, alternatively, to add a known gelatinization retarder such as sodium sulfate to the reaction mass. A product thus made can be filtered and washed, since it is in the original granule form. On the other hand, a gelatinized starch derivative may be made by permitting gelatinization of the reaction mass, by using sufficient heat and/or alkali. This gelatinized mass may, if desired, be dried as by passing over heated drums. Alternatively, the starch derivative may be made in ungelatinized form, filtered and washed if desired, resuspended in water and passed over drums heated sufficiently so as to gelatinize and dry the starch product, which will then be in the so-called cold water soluble form.

As stated, the cationic starch may be used in paper coating compositions in addition to the conventional binder, or in partial or complete replacement thereof. The cationic starch having a positive charge, and the inert mineral pigment and paper fiber having a negative charge, one obtains more than a mere admixture, but rather an electrochemically bound reaction product. It would have been expected that because of this difference in electric charge, the cationic starch would cause the pigment to agglomerate and perhaps even coagulate out of the composition. In fact, this does happen when the starch is too highly substituted with cationic groups, but the surprising finding is that when the cationic starch is one where the number of substituent cationic groups is no more than one per ten anhydroglucose units of the starch, i.e. where the degree of substitution or D.S. of the derivative is no more than 0.10, then the resultant starch-pigment composition is stable, homogeneous and notably effective.

We have found, however, that addition of insolubilizing reagents greatly increases the tendency toward agglomeration and coagulation which occurs when cationic starches are mixed with pigments thereby resulting in an unworkable mass. However, it was subsequently noted that if the cationic starch was one having a D.S. no greater than 0.06, i.e. a starch having no more than 0.6 substituent cationic groups per 10 anhydroglucose units of the starch, then the resultant composition was again stable and effective under conditions wherein insolubilizing reagents are incorporated in the formulation as is the case in the process of this invention.

As for the insolubilizing reagents which are utilized in preparing the insolubilized cationic starches comprising the binders for our novel paper coating compositions, these reagents include, for example: (A) aldehydes such as formaldehyde, paraformaldehyde, glyoxal, glutaraldehyde, and acrolein etc. and dialdehyde starch which contains aldehyde radicals as substituent groups on the starch molecule, thus allowing it to function in many of the same reactions, including the insolubilization of starch, wherein ordinary aldehydes may be utilized; (B) salts of the polyvalent metals such as zinc oxide, aluminum chloride, chromic chloride, potassium pyroantimonate, zirconium chloride, and barium titanate, etc.; (C) thermosetting resins containing a plurality of methylol groups such as urea-formaldehyde resins, melamine-formaldehyde resins, phenol-formaldehyde resins, ketone-formaldehyde resins, and resorcinol-formaldehyde resins, etc.; (D) water soluble polymers such as the styrene: maleic anhydride copolymers and the polymers of ethyleneimine and propyleneimine, etc.; and (E) polyamide resins such as the polyamidamine-epichlorohydrin condensates, etc.

Also applicable for use are various combinations of any of the above described reagents as well as the commercially available mixtures of urea and formaldehyde. It may be noted that aldehydes, and particularly glyoxal, are the preferred insolubilizers for use in the process of this invention.

The inert mineral pigments which are applicable for use in our novel paper coating compositions may be selected from among any of the pigment materials which are ordinarily employed in paper coatings. Thus, one may employ such well known pigments as kaolin clay, calcium carbonate, and titanium dioxide. The latter pigments, as well as any others whose presence is desired by the practitioner, may be utilized either alone or in combination with one another.

The actual preparation of paper coating compositions is, of course, a process well known to those skilled in the art. In general, it involves the formulation of the so-called "clay slip" which is merely a mixture of water with the clay or other selected inert mineral pigment. Often included in the clay slip is a dispersing agent such as sodium hexametaphosphate, tri-sodiumpolyphosphate, tetra-sodium pyrophosphate or the corresponding potassium salts. In addition, an alkaline material such as sodium hydroxide, ammonium hydroxide or various other alkaline salts or hydroxides of alkali metals may also be present. The dispersing agent along with the alkaline material serve to effect the optimum dispersion of the pigment. Moreover, the alkaline material also often serves to adjust the pH of the clay slip. Various other additives such as defoamers and preservatives may be included in the clay slip if so desired by the practitioner.

If the cationic starch derivative is in ungelatinized form, as is generally the case, it is first "cooked" in water, i.e. heated to a temperature beyond the gelatinization point of the starch, and this starch cook is then added to the clay slip. On the other hand, if the cationic starch derivative is a pregelatinized, cold water soluble type, it can be dispersed in cold water and the resulting dispersion added to the clay slip, or less preferably, the dry cold water soluble starch may be added directly to the clay slip and dispersed by sufficient stirring.

Finally, the selected insolubilizing reagent is admixed with the clay slip containing the cationic starch derivative. Although the insolubilizer is usually added as the last ingredient, it is possible to prepare these coating compositions by combining the various components, thereof, in any particular sequence whose use is desired by the practitioner.

The proportions of the various ingredients of our novel coating compositions will naturally be subject to much variation depending upon the particular cationic starch derivative, insolubilizing reagent, and inert mineral pigment which are employed, the method used in applying the coating, as well as the properties desired in the resulting coated paper. However, in general, the clay slip may contain from about 30 to 75%, by weight, of inert mineral pigment. If a dispersant an alkaline material are included, they should be present, respectively, in a concentration of from about 0.2 to 0.4% and 0.05 to 0.2%, by weight, of the pigment. The starch cook should ordinarily have a solids content in the range of from 5 to 50%, by weight.

When the cationic starch derivative and the insolubilizing reagent are admixed with the clay slip, the final coating composition should ordinarily contain from about 3 to 100% of the cationic starch derivative, from 0.2, or lower, up to 0.4% of dispersant and from 0.05 to 0.2% of alkaline material, each of the latter percentages being based upon the weight of inert mineral pigment in the mixture. As for the concentration of the insolubilizing reagent, this should range from about 2 to 30% by weight of the amount of the cationic starch derivative which is present in the formulation. The total solids content of these coating compositions should be in the range of from about 20 to 65%, by weight. The desired pH range for the final formulation will depend upon the particular insolubilizing reagent which is employed. However, in general, the pH will be in the order of from about 5 to 10, the preferred range being from about 6 to 9.

A cationic starch derivative may be used in any desired proportion to replace part or all of the standard, i.e. non-cationic, starch binder in a pigmented paper coating composition. In general, we have found that it is advisable to employ at least about 3.0%, by weight, of the cationic starch as based upon the weight of the inert mineral pigment, in order to achieve the desired improvements in the water resistance of the resulting coated paper. In those coating compositions having a high total solids content, i.e. a total solids content above about 40%, by weight, the preferred amount of cationic starch derivative should be in the order of from about 3 to 30%, as based upon the weight of the pigment. On the other hand, in coating compositions having a low total solids content, i.e. in the range of about 20 to 40%, by weight, of total solids, the preferred range of cationic starch derivative should be from about 10 to 100%, as based upon the weight of the pigment in the formulation. In the lower areas of each of the latter ranges, the cationic starch should, ordinarily, be used together with another binder such as a thermoplastic resin, e.g. polyvinyl acetate or the copolymer of butadiene and styrene etc., or an ordinary starch which may be raw or converted. Needless to say, as one uses larger amounts of the cationic starch derivative, one will approach a point where it is found that no other binder is necessary.

The actual application of our novel paper coating compositions to a paper or paperboard substrate may be accomplished by any means convenient to the practitioner. Thus, for example, one may utilize such coating methods as the air knife, roll coater, wire wound rod, trailing blade and size press, etc. Following their application, the resulting coatings should be dried and, with the exception of those coatings containing polyaldehyde insolubilizing reagents, e.g., glutaraldehyde, glyoxal, and dialdehyde starch, etc., it is then necessary to cure the coated paper in order to effect the desired reaction between the insolubilizing reagent and the cationic starch derivative. It is this reaction which actually insolubilizes the cationic starch and thus makes possible the high degree of water resistance displayed by the resulting coatings. In curing the thus coated paper, it may be merely stored at ambient temperatures for a period of from 1 to 7 days or, on the other hand, the cure may be accelerated by heating the paper in the drier section of the paper coater.

The following examples will further illustrate the embodiment of this invention. In these examples, all parts given are by weight unless otherwise noted.

EXAMPLE I

This example illustrates the use of a number of different insolubilizing reagents in the preparation of the water resistant paper coatings of this invention.

The basic procedure used in preparing the various coating formulations described below involved the initial preparation of a clay slip by dispersing 100.0 parts of kaolin clay in 43.0 parts of water to which there had previously been added 0.3 part of sodium hexametaphosphate and 0.1 part of sodium hydroxide.

The cationic starch binder utilized in these formulations was a diethylaminoethyl ether of a corn starch which had previously been acid converted to a degree known in the trade as 75 fluidity. This tertiary amine derivative had a D.S. of 0.04 and was prepared by the reaction of the 75 fluidity corn starch base with b-diethylaminoethyl chloride hydrochloride according to the procedure described in Example I of U.S. Patent No. 2,813,093.

A portion, comprising 16.0 parts, of the above described starch derivative was dispersed in 64.0 parts of water, the resulting dispersion then being cooked for 20 minutes at a temperature of 195° F. With agitation, the cooked starch dispersion was thereupon added to the previously prepared clay slip whereupon the selected insolubilizer was introduced in order to complete the preparation of the coating composition.

Using a #8 wire wound rod, the various coating compositions, as prepared by means of the above described procedure, were then coated, respectively, onto sheets of andard offset stock having a basis weight of 47 lbs. per ;am. The resulting coated sheets were dried by being ;ated in an oven, set at 100° C., for a period of 45 inutes.

The wet-rub resistance of the sheets which had thus :en coated with formulations containing varying pro->rtions of different insolubilizers was then determined y the use of the Taber Abrader according to test pro-:dure RC-184 of the Technical Association of the Pulp 1d Paper Industry (TAPPI) with the exception, in this 1stance, that a rubber covered roller was used in place f the brush called for by the TAPPI procedure. This et-rub resistance test is used to measure the resistance ) the rubbing off of the coating after the latter has been :oistened. Thus, the coated paper is subjected to rub- ing under controlled conditions of pressure and wetting 1d the amount of coating which is removed from the aper is indirectly measured by turbidometric means on photometer. In this series of tests, the apparatus was ;ed with a 100.0 gram load and the sheets were run trough a total of 20 cycles on the Abrader apparatus.

The following table presents the results of these wet-1b resistance tests. The results are expressed on a nu-1erical scale of from 0–100 wherein 100 denotes perfect et rub resistance with progressively lower readings indi- iting an increasingly poor wet-rub resistance.

| ircent Insolubilizer on Cationic Starch Binder | Results of Wet-Rub Resistance Tests | | |
|---|---|---|---|
| | 2 | 15 | 30 |
| solubilizer Utilized in Coating: | | | |
| Glyoxal | 82 | 100 | 100 |
| A melamine-formaldehyde resin | 31 | 100 | 100 |
| A monomeric mixture of urea and formaldehyde | 50 | 100 | 100 |
| A water soluble copolymer of styrene and maleic anhydride | 6 | 96 | 100 |
| Potassium pyroantimonate | 100 | 100 | 100 |
| A polyamidamine-epichlorohydrin condensate | 55 | 100 | 100 |

When the above described coating procedure was re-eated using a formulation which was devoid of any in->lublizing reagent, the wet rub resistance of the result-1g coating had a value of 2. The latter procedure may 1en be said to represent a control for this series of <periments.

The above data clearly indicates how, by increasing 1e concentration of insolubilizer, the water resistance f the resulting coatings containing cationic binders is, 1 turn, improved. The extremely poor results obtained ith the control indicate the significance of the insolu-ilization reaction upon the performance, as binders, of 1tionic starches.

EXAMPLE II

This example illustrates the use of a number of differ-1t types of cationic starch derivatives, as binders, in the ovel coating compositions of this invention.

Using the same procedure described in Example I, here-1above, a number of coating formulations were prepared ·hich, in this case, each contained 16.0 parts of a differ-1t cationic starch binder along with 1.6 parts, i.e., 10% f the binder, of glyoxal as the insolubilizer.

The resulting coatings formulations were thereupon )ated upon the same type of paper and by means of the 1me coating technique as was described in Example I. [owever, in this case, the resulting coatings were dried )r only 2 minutes at 100° C. The wet rub resistance f the thus coated sheets was then determined using the 1me procedure described in Example I.

Below are listed the cationic starch derivatives utilized 1 preparing the various coating formulations herein escribed.

*Derivative #1.*—A tertiary amine comprising the di-thylaminoethyl ether of corn starch having a D.S. of 0.02, as prepared by the reaction of corn starch with b-diethylaminoethyl chloride hydrochloride according to the procedure of Example I of U.S. Patent No. 2,813,093.

*Derivative #2.*—A phosphonium ether of corn starch, having a D.S. of 0.01, as prepared by the reaction of corn starch with 2-chloroethyl tributyl phosphonium chloride according to the procedure of Example II of U.S. Patent No. 3,077,469.

*Derivative #3.*—A sulfonium ether of corn starch, having a D.S. of 0.03, as prepared by the reaction of corn starch with 2-chloroethyl-methyl-ethyl sulfonium chloride according to the procedure of Example I of U.S. Patent No. 2,989,520.

*Derivative #4.*—A quaternary amine derivative of corn starch, having a D.S. of 0.02, as prepared by the reaction of corn starch with b-diethylaminoethyl chloride hydrochloride followed by the reaction of the resulting product with methyl iodide according to the procedure of Example IV of U.S. Patent No. 2,813,093.

The following table presents the results of the wet-rub resistance tests for the coatings containing each of the above described cationic starch binders. As a control, there is also presented the results obtained with coatings derived from additional samples of each of the latter formulations which, in this case, had not been insolubilized by reaction with glyoxal. As still another control, a formulation was prepared with ordinary, i.e. underivatized, corn starch as the binder.

| Derivative Used as Binder | Wet-Rub Resistance | |
|---|---|---|
| | No Glyoxal | 10% Glyoxal on Binder |
| #1 | 2 | 98 |
| #2 | 2 | 99 |
| #3 | 2 | 100 |
| #4 | 2 | 96 |
| Corn Starch Control | 2 | 75 |

The above data again indicates the significance of the insolubilization reaction upon the effectiveness, as paper coating binders, of cationic starches. In addition, the poor results obtained with a conventional, non-cationic, starch are also illustrated.

It may be noted that paper coating formulations of comparable effectiveness have been prepared using cationic starch binders derived from a variety of starch bases including potato, high amylose corn, tapioca, and waxy maize starches and whose D.S. has varied from about 0.01 to 0.06.

In addition, coating formulations have been prepared wherein the binder comprised a blend of 80 parts of a corn starch treated with sodium hypochlorite, i.e. an oxidized starch, and 20 parts of the above described di-ethylaminoethyl ether of corn starch. It was noted that the water resistance of the resulting coating obtained with the latter blend was substantially higher than that of a coating containing only the oxidized starch as a binder.

EXAMPLE III

This example illustrates the poor results obtained when a variety of non-cationic starch derivatives are utilized, as binders, in coating formulations comparable to the cationic starch containing formulations of this invention.

Using the same procedure described in Example I, hereinabove, a number of coating formulations were prepared which, in this case, each contained 16 parts of a different non-cationic starch binder along with 1.6 parts, i.e. 10% of the binder, of glyoxal as the insolubilizer.

The resulting formulations were thereupon coated upon cup stock, having a basis weight of 50 lbs./1000 square feet, using a #20 wire wound rod and the resulting coatings were oven dried for 2 minutes at 100° C. The wet rub resistance of the thus coated sheets was then determined using the procedure described in Example I.

Below are listed the non-cationic starch derivatives utilized in preparing the various coatings herein described.

*Derivative #1.*—A cyanoethyl ether of corn starch.

*Derivative #2.*—An oxidized corn starch prepared by reaction of corn starch with sodium hypochlorite.

*Derivative #3.*—A hydroxyethyl ether of corn starch.

As a control, a coating formulation was prepared wherein the binder was a cationic dextrin derivative comprising the diethylaminoethyl ether of a potato dextrin, having a D.S. of 0.02, as prepared by the reaction of a potato dextrin with b-diethylaminoethyl chloride hydrochloride according to the procedure of Example I of U.S. Patent No. 2,813,093.

The following table presents the results of the wet-rub resistance tests for the coatings containing each of the above described binders.

| Binder: | Wet-rub resistance |
|---|---|
| Derivative #1 | 67 |
| Derivative #2 | 74 |
| Derivative #3 | 82 |
| Cationic dextrin control | 100 |

The above data clearly indicates the importance of using only cationic starch derivatives in the novel paper coating formulations of this invention.

Summarizing, this invention is thus seen to provide the practitioner with novel paper coating formulations containing cationic starches as binders therein. The use of these novel coating formulations has been found to yield coatings displaying vastly improved water resistance. Variations may be made in proportions, procedures and materials without departing from the scope of this invention defined by the following claims.

We claim:

1. A paper coating composition comprising water, an inert mineral pigment, and a binder; said binder being an insolubilized cationic starch in a concentration of at least 3% and up to 100% as based on the weight on said inert mineral pigment; the total solids content of the composition being in the range of from 20–65%, by weight; said insolubilized cationic starch comprising a reaction product of: (1) a cationic starch selected from the group consisting of starch ethers and starch esters containing substituents selected from the group consisting of tertiary and quaternary amine groups, sulfonium groups and phosphonium groups with (2) from about 2–30%, by weight of said cationic starch, of an insolubilizing reagent selected from the group consisting of (a) aldehydes selected from the group consisting of formaldehyde, paraformaldehyde, glyoxal, glutaraldehyde, acrolein and dialdehyde starch; (b) salts of the polyvalent metals selected from the group consisting of zinc oxide, aluminum chloride, chromic chloride, potassium pyroantimonate, zirconium chloride, and barium titanate; (c) thermosetting resins containing a plurality of methylol groups selected from the groups consisting of urea-formaldehyde resins, phenol-formaldehyde resins, melamine formaldehyde resins and resorcinol-formaldehyde resins; (d) water soluble vinyl polymers selected from the group consisting of styrene:maleic anhydride copolymers, polymers of ethyleneimine, and polymers of propyleneimine; and, (e) polyamide resins selected from the group consisting of the polyamidamine epichlorohydrin condensates.

2. The paper coating composition of claim 1, wherein said cationic starch is a tertiary amino alkyl ether of starch.

3. The paper coating composition of claim 1, wherein the number of substituent groups in said cationic starch is no greater than 0.6 per ten anhydroglucose units of the starch.

4. The paper coating composition of claim 1, wherein said cationic starch has been insolubilized by reaction with glyoxal.

5. Paper coated with the dried residue derived from a coating composition comprising water, an inert mineral pigment, and a binder; said binder being an insolubilized cationic starch in a concentration of at least 3% and up to 100% as based on the weight of said inert mineral pigment; the total solids content of the composition being in the range of from 20–65%, by weight; said insolubilized cationic starch comprising a reaction product of: (1) a cationic starch selected from the group consisting of starch ethers and starch esters containing substituents selected from the group consisting of tertiary and quaternary amine groups, sulfonium groups and phosphonium groups with (2) from about 2–30%, by weight of said cationic starch, of an insolubilizing reagent selected from the group consisting of (a) aldehydes selected from the group consisting of formaldehyde, paraformaldehyde, glyoxal, glutaraldehyde, acrolein and dialdehyde starch; (b) salts of the polyvalent metals selected from the group consisting of zinc oxide, aluminum chloride, chromic chloride, potassium pyroantimonate, zirconium chloride, and barium titanate; (c) thermosetting resins containing a plurality of methylol groups selected from the groups consisting of urea-formaldehyde resins, phenol-formaldehyde resins, melamine formaldehyde resins and resorcinol-formaldehyde resins; (d) water soluble vinyl polymers selected from the group consisting of styrene:maleic anhydride copolymers, polymers of ethyleneimine, and polymers of propyleneimine; and, (e) polyamide resins selected from the group consisting of the polyamidamine-epichlorohydrin condensates.

6. The coated paper of claim 5, wherein said cationic starch is a tertiary amino alkyl ether of starch.

7. The coated paper of claim 5, wherein the number of substituent groups in said cationic starch is no greater than 0.6 per ten anhydroglucose units of the starch.

8. The coated paper of claim 5, wherein said cationic starch has been insolubilized by reaction with glyoxal.

References Cited by the Examiner

UNITED STATES PATENTS

| 2,867,615 | 1/1957 | Lehmann et al. | 106—210 XR |
| 3,127,393 | 3/1964 | Thayer. | |
| 3,145,116 | 8/1964 | Zienty | 106—210 |
| 3,219,518 | 11/1965 | Barber et al. | 106—210 XR |

ALEXANDER H. BRODMERKEL, *Primary Examiner.*

L. B. HAYES, *Assistant Examiner.*